United States Patent [19]
Suzuki et al.

[11] 3,866,270
[45] Feb. 18, 1975

[54] ADJUSTABLE HINGE FITTING FOR A SEAT WITH A MOVABLE BACK

[75] Inventors: Toshio Suzuki, Okazaki; Takami Terada, Toyota; Ryoichi Fukumoto, Nagoya; Hisao Matsumoto, Aichi, all of Japan

[73] Assignee: Aisin Seiki Kabushiki Kaisha, Kariya City, Aichi Prefecture, Japan

[22] Filed: May 3, 1973

[21] Appl. No.: 356,747

[30] Foreign Application Priority Data
May 5, 1972  Japan................... 47-4752621[U]

[52] U.S. Cl.............. 16/146, 297/216, 297/369, 297/379
[51] Int. Cl. .................. E05d 11/10, B60r 21/00
[58] Field of Search...... 16/146; 297/216, 379, 355, 297/367, 368, 369

[56] References Cited
UNITED STATES PATENTS

| | | | |
|---|---|---|---|
| 2,784,770 | 3/1957 | Herr.................. | 297/367 |
| 2,993,732 | 7/1961 | Walker................ | 297/216 |
| 3,582,133 | 6/1971 | Delavenne............ | 297/216 |
| 3,641,838 | 2/1972 | Turner................ | 297/369 |

*Primary Examiner*—Paul R. Gilliam
*Assistant Examiner*—Kenneth J. Dorner

[57] ABSTRACT

A hinge arrangement for pivotally connecting the back to the seat frame, particularly of an automobile vehicle. A releasable locking device is combined with such an arrangement for adjusting the degree of inclination of the back rest through an angle of small or large magnitude relative to the seat.

4 Claims, 2 Drawing Figures

ADJUSTABLE HINGE FITTING FOR A SEAT WITH A MOVABLE BACK

BACKGROUND OF THE INVENTION

In arrangements of this type, the possibility always exists of ruining the mechanism because of shock resulting from a sudden stop of the forward travel of the vehicle as by collision, causing a passenger in the rear passenger seat of the vehicle to strike the back rest of the seat under considerable inertial force, and thereby further causing the passenger to be thrown forwardly out of the seat. In order to safeguard the device against excessive stress being exerted by such over-loads and prevent the occupant from being thrown forwardly out of the seat, means to provide a better buffer is required against angular movement of the back rest caused by the inertial force in case of the sudden stop of the vehicle produced by the occupant in the rear passenger seat.

While various means have been previously employed for meeting such requirements, none have proven to be entirely satisfactory.

SUMMARY OF THE INVENTION

Accordingly, among the objects of the invention is the provision of a device for adjusting the degree of inclination of a seat back relative to the seat portion by means of a disc-like sector gear which is loose on the swivel axis of the two parts of the arrangement and formed on its edge with an arcuate series of teeth and a notch or recess, and of a pair of pawl-and-handles associated with the two parts being adapted to engage the teeth and notch respectively at a different angular positions of the back rest relative to the seat.

Another object of the invention is to provide a two-part hinge arrangement for adjustably connecting a back rest of an automobile seat which is enabled to provide a buffer against the shock of the passenger in the rear seat being thrown against the back of the front seat due to the inertia of a sudden stop.

The foregoing and other objects are attained by a two-part hinge arrangement for adjustably connecting a seat and a back rest, especially in motor vehicles, which according to the invention comprises a first arm as one part of the hinge adapted to be fixedly connected to either the seat or the back; second and third arms normally integral with the other part thereof and adapted to be fixedly connected to the other of the seat and back; first pivot means for pivotally connecting both the second and third arms together to the first arm; second pin means to connect the second and third arms together but to permit pivoting relative to each other in case of breakage of said first pin means; a device combined with such an arrangement for adjusting the degree of inclination of the back rest through a small or large angle relative to the seat by means of a gear sector which is loose on the first pin and of a pair of pawl-and-handles associated with the first and second arms respectively adapted to releasably engage the sector at its teeth and notch respectively; and damper means rotatably anchored at its one end to the first arm and at the other end to the first pin being characterized by the fact that strength of the first pin is of lesser magnitude than that of the second pin so that an earlier breakage is offered of the first pin to disconnect the third arm from the second arm at the first pin while the other pin still remains normal in case of the sudden stop of the vehicle so as to permit the third arm to swivel about the second pin for operating the damper means whereby buffer is provided against the shock of the passenger in the rear seat being thrown against the back of the front seat due to the inertia of a sudden stop.

DESCRIPTION OF A PREFERRED EMBODIMENT

Figure 1:
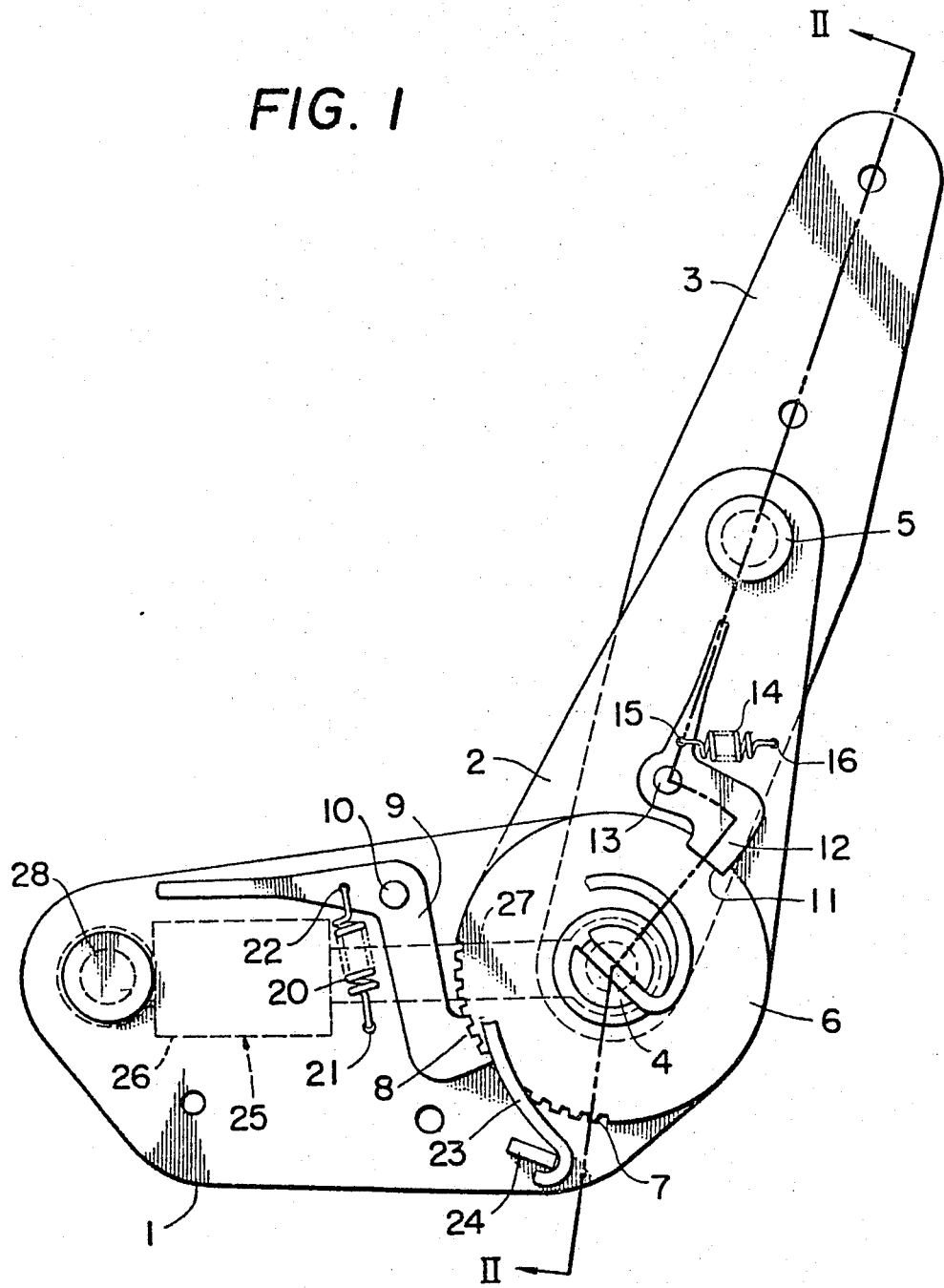
FIG. 1 shows a side view of one embodiment of the hinge arrangement constructed according to the invention.

Referring now to the drawings, and more specifically to FIG. 1 thereof, it will be seen that the two part hinge arrangement according to the present invention comprises a fixed arm 1 fixedly fastened to a seat, not shown, of a vehicle seat, a tiltable second arm 2 and a third arm 3. As shown, the second and third arms 2 and 3 are pivotally connected to the arm 1 by a first pin 4 providing a swivel axis for tilting the back rest in a manner to be described below. It will further be seen that the third arm 3 is in turn pivotally connected to the second arm by a second pin 5 but not normally swingable thereabout, except in case of accidental breakage of the pin 4 of lesser strength than the pin 5. This is important to obtain the desired result which will be explained hereinafter.

In order to retain the back rest in a tilted position, a disc or segmental gear 6 is provided. It should be noted that the arm 2 is securely mounted on the first pin 4 in ordinary manner so that a portion 4a of rectangular cross section suits the correspondingly shaped hole in the arm 2 with the arm 2 securely mounted thereon. The arms 3 and 1 are both in running fit on the first pin 4. It will be obvious that the both arms 2 and 3 together swing about the axis of the first pin 4 in the normal mode of operation as will be described hereinafter. The disc or sector gear 6 is loose on the pin 4 and is formed on its edge with an arcuate series of teeth 7 cooperatingly engaged with a series of teeth 8 of a handle-and-pawl 9 pivotally connected to the arm by a pin 10. The pawl 9 is normally urged toward engagement with the arcuate series of teeth 7 by a spring 20 anchored at its one end to a small hole 21 in the arm 1 and at the other end to another small hole 22 in the handle-and-pawl. The disc 6 is further provided with a notch or recess 11 to which is always urged a second handle-and-pawl 12. The handle-and-pawl 12 is pivoted to the arm 2 by a pin 13 and is always urged toward engagement with the notch 11 by a spring 14 which is anchored at its one end to a small hole 15 in the pawl 12 and at the opposite end to another small hole 16 in the arm 2. Retaining means is thus provided for the arm 2 by both handle-and-pawls 9 and 12 in cooperation with such corresponding teeth 7 and notch 11. A large spiral torsion spring 23 is anchored at its central end to a slit formed at the top end of the pin 4 in the ordinary manner, while at the other end to a projection 24 on the arm 1, so that the back rest of the vehicle is normally urged toward forward tilting by the spring 23.

In operation, arm 2 tilts about the axis of pin 4 since it is fixed to pin 4 by virtue of rectangular portion 4a, through a large angle by releasing the handle-and-pawl 12 out of engagement with the notch 11 on the disc 6, as desired. The back rest may otherwise be permitted to angularly move about the first pin 4 through an angle of lesser magnitude, as desired, by disconnecting the handle-and-pawl 9 from the teeth 7 on the edge of the disc 6. It will be obvious that the provision of the handle-and-pawl 9 and its associated parts is for the purpose of a slight adjustment of the degree of inclination of the back relative to the seat. It will therefore be noted that the sector 6 either may be associated with the arm 1 or 2.

Figure 2:
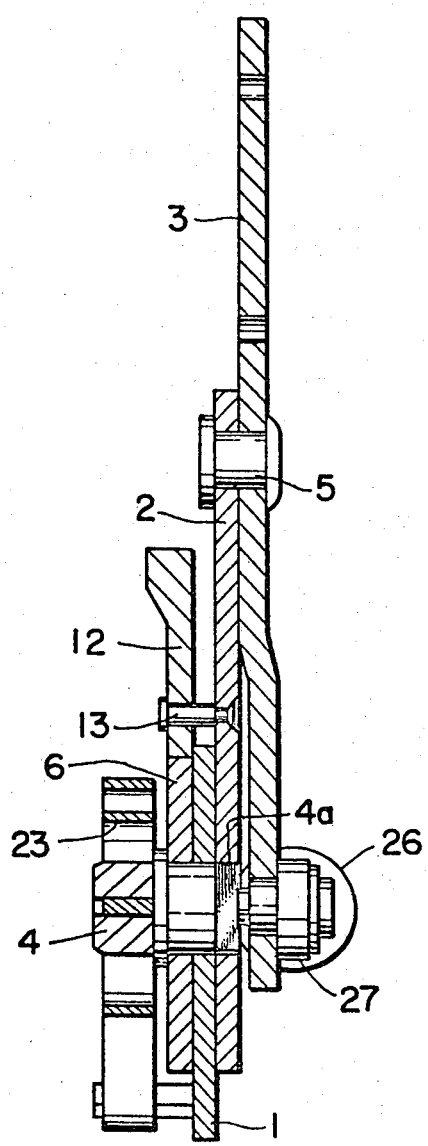
FIG. 2 is a cross section taken along the line II—II of FIG. 1.

A damper means is provided as generally indicated by the numeral 25 in phantom by dot and dash line while in a normal position in FIG. 1. The damper 25 is of ordinary construction comprising a piston and cylinder assembly to apply pressure to the contents, such as silicone resin, within the cylinder so as to provide resistance against the angular movement of the back caused by the inertial force of the passenger in case of the sudden stop of the vehicle. A greater buffer effect is obtained by the structure of the damper. The details of the damper are conventional and do not form a part of the present invention. It is obvious that changes can be made in the structure and still bring about operation of the parts. In FIG. 1, the numeral 26 indicates the cylinder and the numeral 27 indicates the plunger slidably received within the cylinder. One end of the cylinder is pivotally connected to the arm 1 by a pin 28 and the opposite end of the plunger or piston 27 is likewise pivotally connected to the arm 3 by the pin 4 at its extending portion as will best be seen in FIG. 2.

In order to understand the function of the feature of the present invention, first assume that connection by the first pin 4 between the arms 2 and 3 is broken whereas connection by the pin 5 between the arm 2 and 3 still remains normal, to thereby provide a new simple combination of a lever and a connecting link. The arm 3 corresponds to the lever swingable about the pin 5 and the damper 25 corresponds to the connecting link which would be able to reduce its length to provide a large resistance against swing motion of the arm 3 about the second pin 5.

From the foregoing, it follows that the damper 25 provides buffer means against the angular movement of the back rest about the second pin 5 caused by the inertial force which is applied by the passenger in the rear seat in case of a sudden stop of the vehicle, as by collision.

For attaining the object to provide such buffer means, reduced strength must be calculated with respect to the first pin 4 than the pin 5. That calculation will cause earlier breakage of the first pin 4 so that the arm 3 is disconnected from the arm 2 at the first pin 4, while pivotable connection by the pin 5 and another pivotable connection by the pin 4 between the arm 3 and the plunger 27 still remain normal, if the vehicle should very suddenly become stopped, as by collision, and the passenger strike the back rest of the seat under considerable inertial force. It will be noted that by the calculation of the first pin 4, the new combination of a lever and a connecting link is always ensured in case of the sudden stop of the vehicle.

What is claimed is:

1. A two-part hinge arrangement for adjustably connecting a seat and a backrest, particularly for motor vehicles, comprising, in combination: a first arm fastened to the seat; a second arm; a third arm, said second and third arms being both pivotally connected together to said first arm by a first pin, said second and third arms being connected by a second pin providing a swivel axis against tilting of the back rest, said first pin having a portion of reduced strength between the sections of said first pin which are connected to said second and third arms; a sector gear loosely positioned on said first pin and having on its edge an arcuate series of teeth and a recess; a first handle-and-pawl pivoted on said first arm and having at its end a series of teeth for engaging the arcuate series of teeth on said sector; a second handle-and-pawl pivoted on said second arm for engaging said recess on said sector; torsion spring means to normally urge said sector toward rotation in a predetermined direction; and damper means pivotally connected at its one end to said first arm and at the opposite end to said first pin to thereby resist angular movement of said third arm about said second pin, when said portion of reduced strength of said first pin breaks while said second pin remains intact.

2. The two-part hinge arrangement as claimed in claim 1 wherein, said first handle-and-pawl is normally urged toward engagement with said arcuate series of teeth on said sector by means of a spring anchored at its one end to the first arm and at the other end to said first handle-and-pawl, said second handle-and-pawl being normally urged toward engagement with said notch by means of a spring anchored at its one end to said second arm and at the other end to said second handle-and-pawl.

3. The two-part hinge arrangement as claimed in claim 2 wherein, said second arm is fixedly connected to said first pin and said first and third arms are both loose on said first pin.

4. The two-part hinge arrangement as claimed in claim 3 wherein, said torsion spring means is anchored at its central end to said first pin and at the other end to said first arm, to thereby normally urge said second arm in a predetermined direction.

* * * * *